(12) United States Patent
Jiang

(10) Patent No.: US 12,594,701 B2
(45) Date of Patent: Apr. 7, 2026

(54) MEAL BOWL AND A PRODUCTION PROCESS FOR THE MEAL BOWL

(71) Applicant: Yanghuan Jiang, Changsha (CN)

(72) Inventor: Yanghuan Jiang, Changsha (CN)

( * ) Notice: Subject to any disclaimer, the term of this patent is extended or adjusted under 35 U.S.C. 154(b) by 72 days.

(21) Appl. No.: 18/380,663

(22) Filed: Oct. 17, 2023

(65) Prior Publication Data

US 2024/0042661 A1     Feb. 8, 2024

(51) Int. Cl.
| | |
|---|---|
| *B29C 45/14* | (2006.01) |
| *B29C 45/00* | (2006.01) |
| *B29C 45/16* | (2006.01) |
| *B65D 1/36* | (2006.01) |
| *B65D 65/42* | (2006.01) |
| *B29K 21/00* | (2006.01) |
| *B29K 23/00* | (2006.01) |
| *B29K 83/00* | (2006.01) |
| *B29L 31/00* | (2006.01) |

(52) U.S. Cl.
CPC .... *B29C 45/14811* (2013.01); *B29C 45/0001* (2013.01); *B29C 45/0025* (2013.01); *B29C 45/14008* (2013.01); *B29C 45/1676* (2013.01); *B65D 1/36* (2013.01); *B65D 65/42* (2013.01); *B29C 2945/761* (2013.01); *B29K 2021/003* (2013.01); *B29K 2023/12* (2013.01); *B29K 2083/00* (2013.01); *B29K 2995/0026* (2013.01); *B29K 2995/007* (2013.01); *B29L 2031/7132* (2013.01)

(58) Field of Classification Search
CPC ........... B29C 2045/14688; B29C 2045/14696; B29C 2045/14704; B29C 2045/14713; B29C 2045/14721; B29C 2045/14729; B29C 2045/14737; B29C 2045/14745; B29L 2031/7132; B29L 2031/7166; B29L 2031/712
See application file for complete search history.

(56) References Cited

U.S. PATENT DOCUMENTS

| | | | | | |
|---|---|---|---|---|---|
| 2006/0244171 | A1* | 11/2006 | Yu | ........................ | B29C 45/1418 264/161 |
| 2009/0302490 | A1* | 12/2009 | Lee | ..................... | B29C 45/1671 425/317 |
| 2010/0230853 | A1* | 9/2010 | Su | ..................... | B29C 45/14688 264/220 |

FOREIGN PATENT DOCUMENTS

| | | | | | |
|---|---|---|---|---|---|
| DE | 102014203543 A1 * | 8/2015 | ......... | B29C 37/0032 |
| EP | 1977875 A1 * | 10/2008 | ........... | B29C 45/062 |

* cited by examiner

*Primary Examiner* — Atul P. Khare

(74) *Attorney, Agent, or Firm* — Jose Cherson Weissbrot

(57) ABSTRACT

The present invention provides a production process for a meal bowl and a meal bowl, the production process being, in sequence, a first injection molding, a first printing, a second printing, and a second injection molding, and the meal bowl obtained has upper transparent shell, pattern layer, separation layer, and soft plastic layer, and the presence of upper transparent shell eliminates the possible presence of industrial pigments, bowl bottom pattern ink or heavy metals in colored glazes, which potential harm to humans or infants, and low food safety risk.

12 Claims, 3 Drawing Sheets

MEAL BOWL AND A PRODUCTION PROCESS FOR THE MEAL BOWL

TECHNICAL FIELD

The present invention relates to the technical field of daily living goods, in particular to a meal bowl and a production process for the meal bowl.

BACKGROUND

As infants and toddlers are active, therefore, in order to be safe, the tableware for infants and toddlers generally use silicone tableware or plastic tableware.

Silicone tableware is difficult to print patterns, so the vast majority of silicone dinner plates (bowls) in the production of raw materials in the product need to add color pigments to enhance the interest of infants and children to eat, the pigment in the chemical raw materials in the migration or precipitation to the surface of the probability of having with the food together with the risk of ingestion. Even with the addition of color pigments, this type of product will still have the disadvantage of a single color. In addition, the density of silicone is close to that of ceramics, and its inherent mass is large, which makes it difficult to pick up with one hand as it increases in weight after being filled with food.

Plastic tableware printing layer often contains complex chemical composition, children's tableware needs to be repeatedly sterilized at high temperatures, with knives, forks and chopsticks scraping, the use of the product is very harsh conditions, the printing layer and the product is easy to fall off, increasing the risk of food safety for infants and children.

Ceramic tableware is bulky and fragile, the surface of the colored glaze often contains heavy metals, and secondly, ceramic products cannot be designed on the product suction pad, is not suitable for infants and young children.

In the existing products, for the protection of the printed layer of the product, most of the protective layer for: blowing out of the transparent plastic protective film covering the area close to the area of the printed pattern, the structure of a single, easy to damage; not high temperature; not anti-corrosion, not prevent the pollution of chemical raw materials; secondly, the existing products in the transparent protective film; only cover the surface of the pattern, the rest of the bowl is not protected in the use of the rest of the bowl, food is still in contact with the rest of the bowl body In the process of use, the food is still in contact with the rest of the bowl pigment, there is a hidden danger of use; and the printed layer, cannot be done to cover the whole bowl.

SUMMARY

In order to solve the problems existing in the prior art, the present invention provides a production process of a meal bowl, the meal bowl produced by the production process, the food contained in the meal bowl will not come into contact with harmful chemical materials such as industrial pigments, and it is safe to use; and the meal bowl produced by the production process has the advantages of being colorful, beautiful, safe, anti-detachment and non-slip.

In order to achieve the above purpose, the technical solution of the present invention is:

A production process for a meal bowl, the production process comprising the following steps:

Step 1, preparing a transparent raw material that can be injected and does not contain industrial pigment, a high temperature resistant ink, an injectable soft rubber with color, a first injection mold, a second injection mold, a first shaping mold, a second shaping mold, a printing machine and an injection molding machine;

Step 2, injecting said transparent raw material into said first mold after it has been heated and melted by means of said injection molding machine to obtain an upper transparent shell;

Step 3, fixing said upper transparent shell inversely to said printing machine, exposing the bottom and printing a desired pattern on the bottom of said upper transparent shell using said high temperature resistant ink to obtain a pattern layer;

Step 4, printing a separation layer covering said pattern layer on the bottom of said upper transparent shell;

Step 5, placing said upper transparent shell printed with said pattern layer and said segregation layer in said second mold, injecting said soft rubber into said second mold after being melted by heating through said injection molding machine, so that said soft rubber covers said segregation layer.

A meal bowl, produced by the production process of the meal bowl described above, comprising an injection molded upper transparent shell; a pattern layer printed on the bottom surface of said upper transparent shell; a separation layer printed on the bottom surface of said upper transparent shell covering said pattern layer; and a soft plastic layer injected on the bottom surface of said upper transparent shell to produce the meal bowl.

The above process, first injection molding of the upper transparent shell, and then use high temperature resistant ink to print the desired pattern on the bottom of the said upper transparent shell, where the pattern can be any pattern that babies and young children like; setting the separation layer helps to enhance the color of the pattern layer. The color of the printed pattern layer will not be affected by the color of the lower structure; the injection molded soft rubber covers the entire bottom of the upper transparent shell, and closes the pattern layer and the separation layer.

Through the above process to make from top to bottom of the upper transparent shell, pattern layer, separation layer and soft plastic layer of the bowl, the baby's favorite patterns with the separation layer as the background can be clearly through the upper transparent shell, and the color of the bowl is not affected by the lower structure; injection molded soft plastic wrap the whole bottom of the upper transparent shell to close the pattern layer and separation layer. The pattern that babies and children like can be clearly shown through the upper transparent shell, while the food contact is always with the upper transparent shell. The existence of the upper transparent shell eliminates the harm to babies and children caused by heavy metals in industrial coloring, ink or glaze that may be present in bowls produced by traditional methods, and the risk of food safety is low; while the product combines other types of materials with the upper transparent shell. The product combines the advantages of other types of materials, and is characterized by its beauty, light weight and durability.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the drawings.

Figure 1:
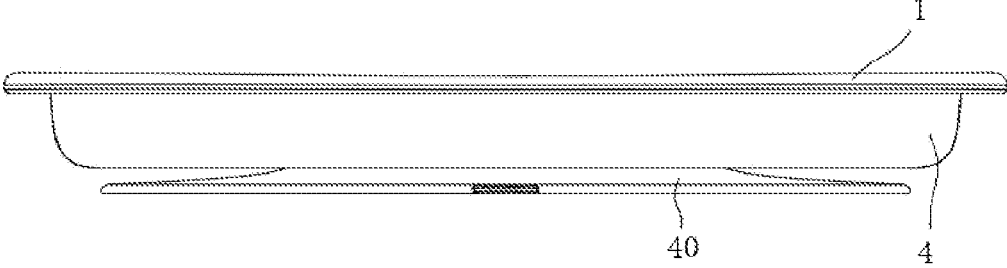
FIG. 1 shows a main view of an embodiment of the present invention.
Figure 2:
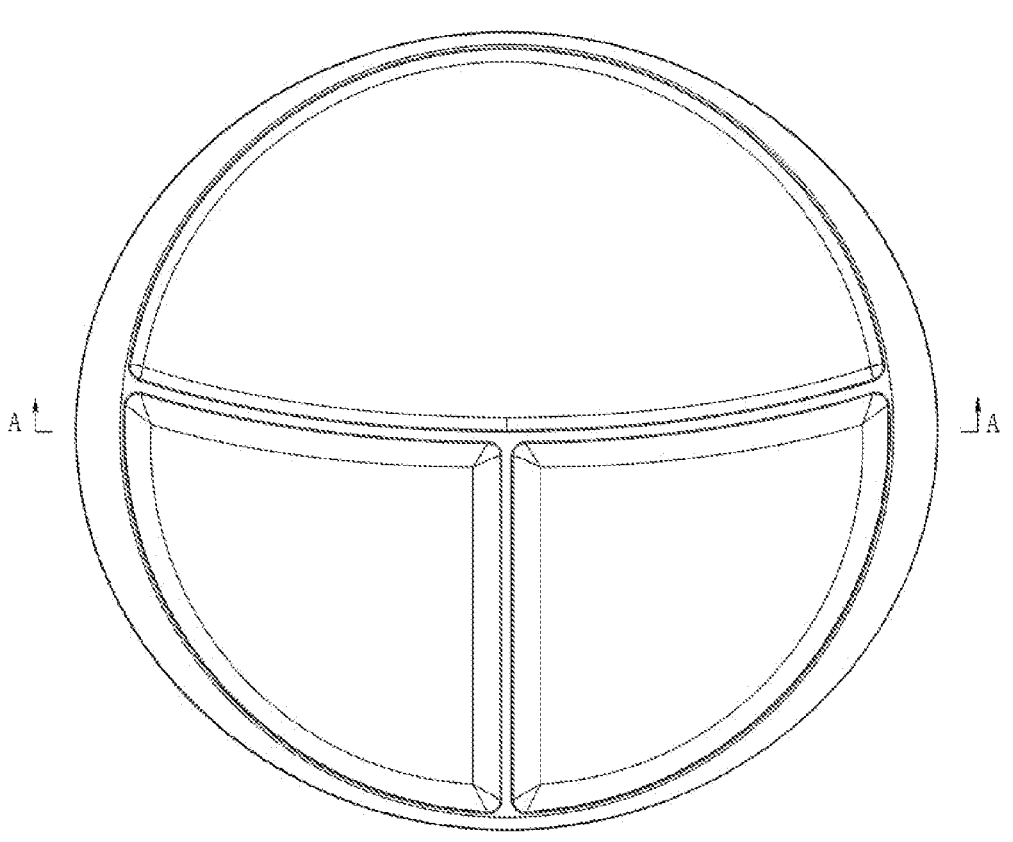
FIG. 2 shows a top view of an embodiment of the present invention.

1, upper transparent shell; 2, pattern layer; 3, separation layer; 4, soft plastic layer; 10, verge; 11, protruding platform; 12, cavity; 13, suction pad.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a" "an" and "the" are intended to include the plural forms as well, unless the context clearly indicates other.

A production process for a meal bowl, comprising the following steps:

Step 1, preparing auxiliary equipment and materials such as a transparent raw material that can be injected and does not contain industrial pigment, a high temperature resistant ink, an injectable soft rubber with color, a first injection mold, a second injection mold, a first shaping mold, a second shaping mold, a printing machine and an injection molding machine.

The transparent raw material is PP, Tritan or other food-grade high-transparency material that does not contain industrial coloring and has a light transmittance of more than 95% and a heat-resistant temperature of more than 100 degrees Celsius.

Figure 3:
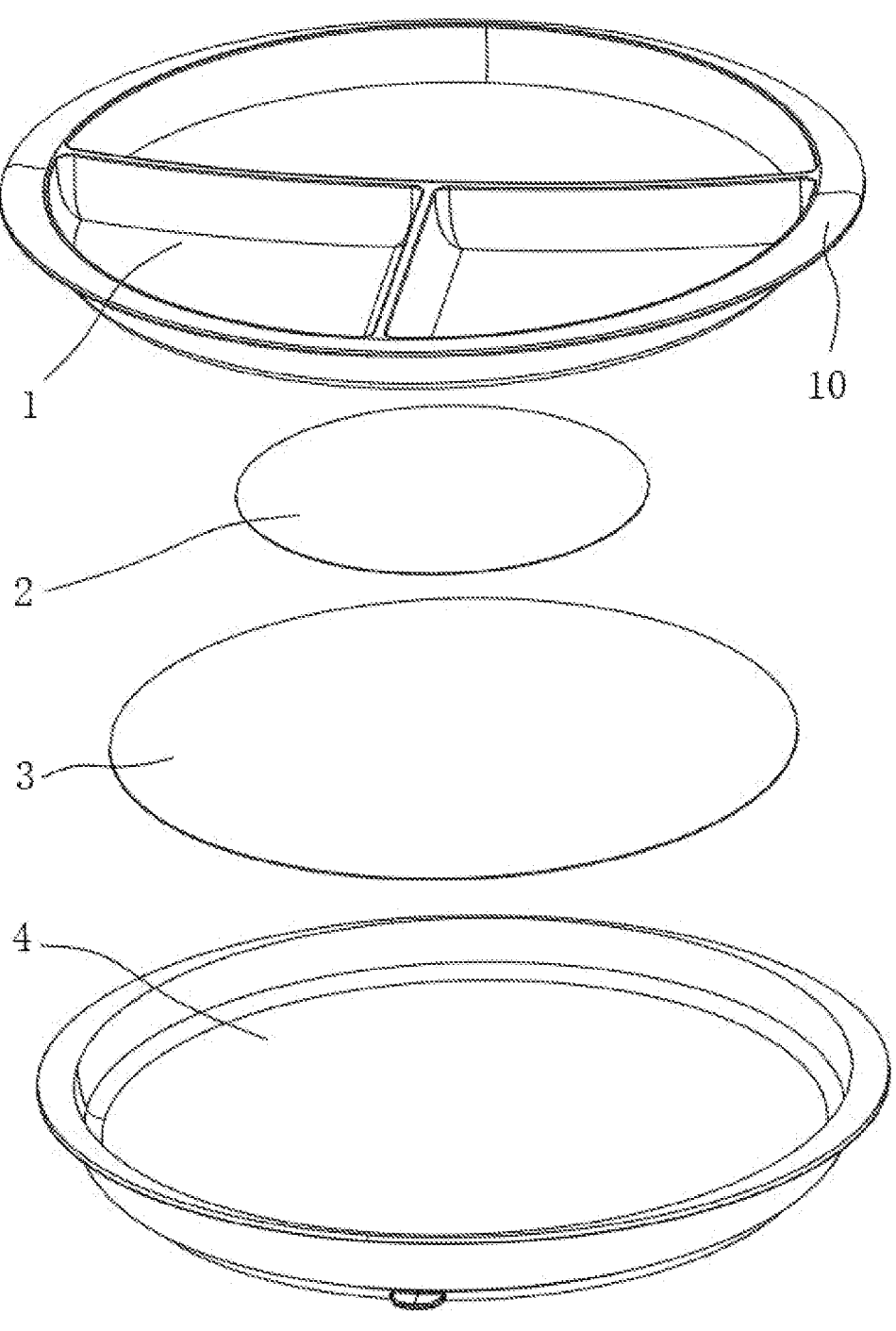
FIG. 3 shows a schematic diagram of a structural layer decomposition of an embodiment of the present invention.
Figure 4:
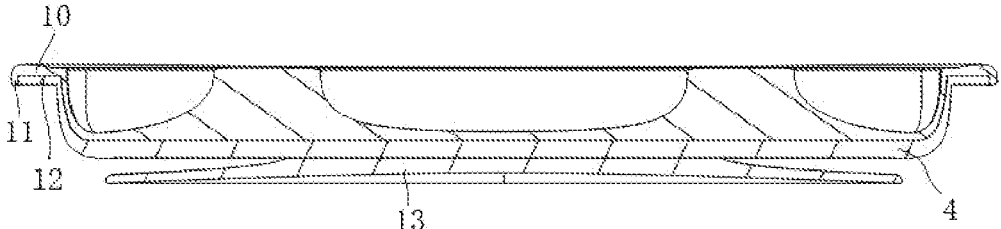
FIG. 4 shows an A-A cross-sectional view of FIG. 2.

Step 2, said transparent raw material is melted by heating through said injection molding machine and then injected into said first mold to obtain the upper transparent shell 1, as shown in FIG. 3, the thickness of the upper transparent shell 1 needs to be greater than 1 mm and is usually controlled to be less than 5 mm, and the upper transparent shell 1 has verge 10 extending outwardly from the bowl body.

cooling said upper transparent shell 1 in said first shaping mold having the same contour as said upper transparent shell 1, in order to reduce deformation and errors resulting from shrinkage, and in order to achieve a better shaping effect, a first injection mold having dimensions identical to those of the cavity 12 in which said upper transparent shell 1 is shaped may be used. In order to achieve a better shaping effect, a first shaping mold with dimensions consistent with the cavity 12 of the first injection mold for molding the upper transparent shell 1 can be used.

Step 3: fixing said upper transparent shell 1 inversely to said printing machine, exposing the bottom, and printing the desired pattern on the bottom of said upper transparent shell 1 using said high temperature resistant ink to obtain a pattern layer 2, as shown in FIG. 3.

In this step, the heat resistant temperature of said heat resistant ink used needs to be greater than 160 degrees Celsius so that said heat resistant ink is not thermally decomposed when injecting the silicone.

The way of printing the pattern layer 2 can be silk screen printing or heat transfer printing, etc.

Step 4, at the bottom of said upper transparent shell 1 there is printed a separation layer 3 covering said pattern layer 2, as shown in FIG. 3; the separation layer 3 helps to enhance the color effect of the pattern layer 2, and the color of the printed pattern layer 2 will not be affected by the color of the underlying structure, the color of the printed pattern layer 2 will not be affected by the color of the underlying structure.

Step 5, placing said upper transparent shell 1 printed with said pattern layer 2 and said separation layer 3 in said second mold, injecting said soft plastic into said second mold after melting by heating in said injection molding machine to form a soft plastic layer 4, as shown in FIG. 3, said soft plastic layer 4 encapsulating said separation layer 3.

The soft plastic used in this step is food-grade TPE or silicone; the heat-resistant temperature of said soft plastic needs to be greater than 100 degrees Celsius; the Shore hardness of said soft plastic needs to be less than 80 degrees Celsius; and the covering range of said soft plastic layer 4 is less than the verge 10 of said upper transparent shell 1.

The color of said soft plastic can be adjusted according to the design requirements of the product, and different colors of soft plastic layer 4 can be obtained by adding different colors of color powder or pigment to the soft plastic during injection molding.

The meal bowl obtained by S5 is placed to cool in said second shaping mold having the same contour as said meal bowl, in order to reduce the deformation and error resulting from shrinkage.

As shown in FIGS. 1 to 4, a meal bowl, made by the above production process of the meal bowl, comprises an upper transparent shell 1 made by injection molding; the thickness of the upper transparent shell 1 needs to be greater than 1 mm, and is usually controlled to be less than 5 mm, and in this embodiment, the thickness of the upper transparent shell 1 is in this embodiment, the thickness of the upper transparent shell 1 is 1.5 mm.

The upper transparent shell 1 has a verge 10 extending outwardly from the body of the bowl, with a protruding platform 11 extending downwardly around the outer periphery of said verge 10; said protruding platform 11 forming a cavity 12.

The transparent raw material for making said upper transparent shell 1 is PP, (Bisphenol) BPA co-polyester or other food-grade highly translucent material having a light transmittance of more than 95% and a heat-resistant temperature of more than 100 degrees Celsius.

Printing of a pattern layer 2 on the bottom surface of said upper transparent shell 1, the printing method being either screen printing or heat transfer printing. The ink for printing the pattern layer 2 needs to be a high temperature resistant ink, said high temperature resistant ink needs to have a heat resistance temperature greater than 160 degrees Celsius so that said high temperature resistant ink is not subjected to thermal decomposition when injection molding silicone or other soft gels.

On the bottom surface of said upper transparent shell 1 is printed a separation layer 3 covering said pattern layer 2, the separation layer 3 is preferably a separation layer 3 printed in white color, the separation layer 3 helps to enhance the color effect of the pattern layer 2, so that the printed pattern layer 2 has a better color effect, layer's color effect, so that the printed pattern layer 2 reveals a color that is not affected by the color of the underlying structure, and the color of the separation layer 3 is not limited to white, but can highlight both the pattern and the color of the pattern layer 2.

Finally, soft plastic is injected at the bottom of the upper transparent shell 1, the covering range of the soft plastic is smaller than the verge 10 of said upper transparent shell 1, and at the same time, the soft plastic is filled with said cavity 12 to form a soft plastic layer 4, resulting in a meal bowl, the cavity 12 can facilitate the combination of the soft plastic layer 4 and the upper transparent shell 1, and the soft plastic layer 4 is flush with the protruding platform 11 after filling the cavity 12. The cavity 12 can facilitate the combination of the soft plastic layer 4 and the upper transparent shell 1, and the soft plastic is flush with the protruding platform 11 after filling the cavity 12, so that the hand feeling is good when picking up.

Further, suction pad 13 may also be provided at the bottom of said soft plastic layer 4, and suction pad 13 may be injected together with the soft plastic layer 4 during injection molding, or suction pad 13 may be injected or bonded again after injection molding of the soft plastic layer 4.

In this embodiment, said soft plastic is food-grade TPE or silicone; said soft plastic has a heat-resistant temperature greater than 100 degrees Celsius; and said soft plastic has a Shore hardness of less than 80 degrees.

In this embodiment, the upper transparent shell 1 is first injection molded, and then the desired pattern is printed on the bottom of said upper transparent shell 1 with high temperature resistant ink, where the pattern can be any pattern that babies and young children like; the setting of a separation layer 3 helps to enhance the color of the pattern layer 2 The color of the printed pattern layer 2 will not be affected by the color of the underlying structure; the injection molded soft rubber covers the entire bottom of the upper transparent shell 1, and closes the pattern layer 2 and the separation layer 3.

Through the above scheme, the bowls are made of upper transparent shell 1, pattern layer 2, separation layer 3 and soft plastic layer 4 from top to bottom, and the patterns that babies and children like can be clearly shown through the upper transparent shell 1 with the separation layer 3 as the background, while the bowls in contact with food are always made of upper transparent shell 1. The pattern that babies and children like can be clearly shown through the upper transparent shell 1, while the food contact is always with the upper transparent shell 1. The existence of the upper transparent shell 1 eliminates the harm to babies and children caused by heavy metals in industrial coloring, ink or glaze that may be present in the bowls produced by traditional methods, so the risk of food safety is low; at the same time, the product is made of food-grade plastic. The product is made of food-grade plastic, which is sturdy and lightweight, and the soft plastic layer 4 provides an effective anti-slip effect, which is good for food preparation and use by infants.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A production process of a meal bowl, the production process comprising:

providing a transparent raw material which is injection moldable and free of industrial coloring, a high temperature resistant ink, a soft rubber with color, a first injection mold, a second injection mold, a first shaping mold, a second shaping mold, a printing machine and an injection molding machine;

heating and melting the transparent raw material through the injection molding machine and injecting the heated and molten transparent raw material into the first injection mold to obtain an upper transparent shell;

fixing the upper transparent shell inversely to the printing machine, so as to expose the bottom thereof, and printing a desired pattern on the bottom of the upper transparent shell using the high temperature resistant ink to obtain a pattern layer;

printing a separation layer covering the pattern layer on the bottom of the upper transparent shell; and placing the upper transparent shell printed with the pattern layer and the separation layer in the second shaping mold, heating and melting the soft rubber through the injection molding machine, and injecting the soft rubber into the second shaping mold to form a soft plastic layer, wherein the soft plastic layer covers the separation layer.

2. The production process of the meal bowl according to claim 1, wherein the transparent raw material is Polypropylene (PP) or another food-grade plastic, wherein the food-grade plastic has a light transmittance rate of more than 95%, and the thickness of the upper transparent shell is more than 1 mm.

3. The production process of the meal bowl according to claim 2, wherein said separation layer is a white separation layer.

4. The production process of the meal bowl according to claim 1, wherein the transparent raw material is PP or another food-grade plastic, wherein the food-grade plastic has a heat-resistant temperature of more than 100 degrees Celsius.

5. The production process of the meal bowl according to claim 1, further comprising cooling the upper transparent shell in the first shaping mold, the first shaping mold having a contour identical to that of the upper transparent shell, and the first shaping mold having dimensions consistent with the cavity of the first injection mold used for molding the upper transparent shell.

6. The production process of the meal bowl according to claim 1, wherein the high temperature resistant ink has a heat-resistant temperature greater than 160 degrees Celsius.

7. The production process of the meal bowl according to claim 1, wherein the pattern layer is produced with the high temperature resistant ink by silkscreen printing or thermal transfer printing.

8. The production process of the meal bowl according to claim 1, wherein the soft rubber is a food-grade thermoplastic elastomer (TPE) or silicone.

9. The production process of the meal bowl according to claim 1, wherein the soft rubber has a heat-resistant temperature greater than 100 degrees Celsius.

10. The production process of the meal bowl according to claim 1, wherein the soft rubber has a shore hardness of less than 80 degrees.

11. The production process of the meal bowl according to claim 1, wherein a wrapping range of the soft rubber is less than a verge of the upper transparent shell, wherein the soft rubber wraps the bottom of the upper transparent shell to close the pattern layer and the separation layer.

12. The production process of the meal bowl according to claim 1, further comprising cooling the meal bowl in the second shaping mold.

* * * * *